Patented Jan. 20, 1942

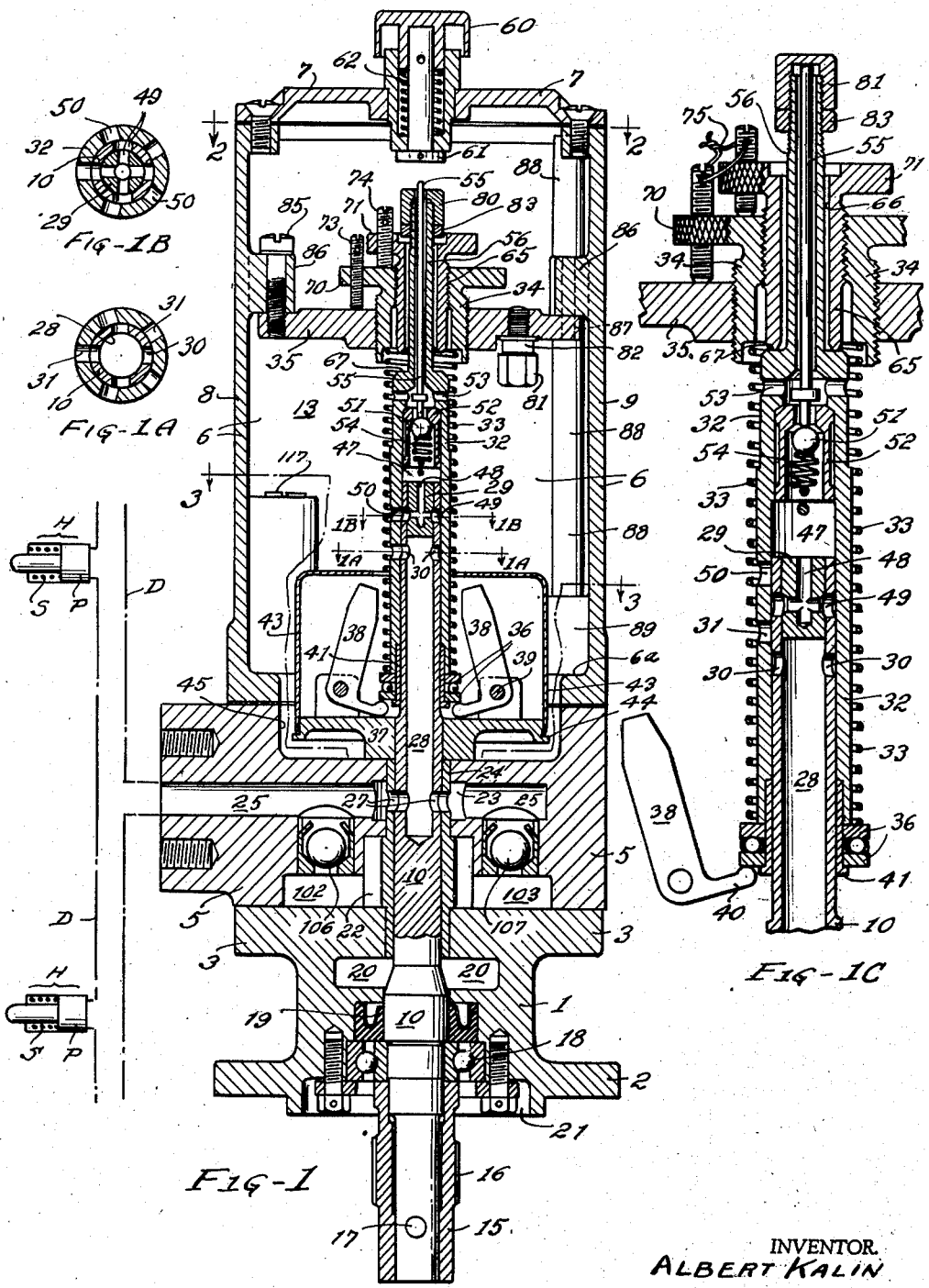
Jan. 20, 1942.   A. KALIN   2,270,306
GOVERNOR
Filed Dec. 30, 1940   2 Sheets-Sheet 1
INVENTOR.
ALBERT KALIN Jan. 20, 1942.　　　　A. KALIN　　　　2,270,306
GOVERNOR
Filed Dec. 30, 1940　　　　2 Sheets-Sheet 2
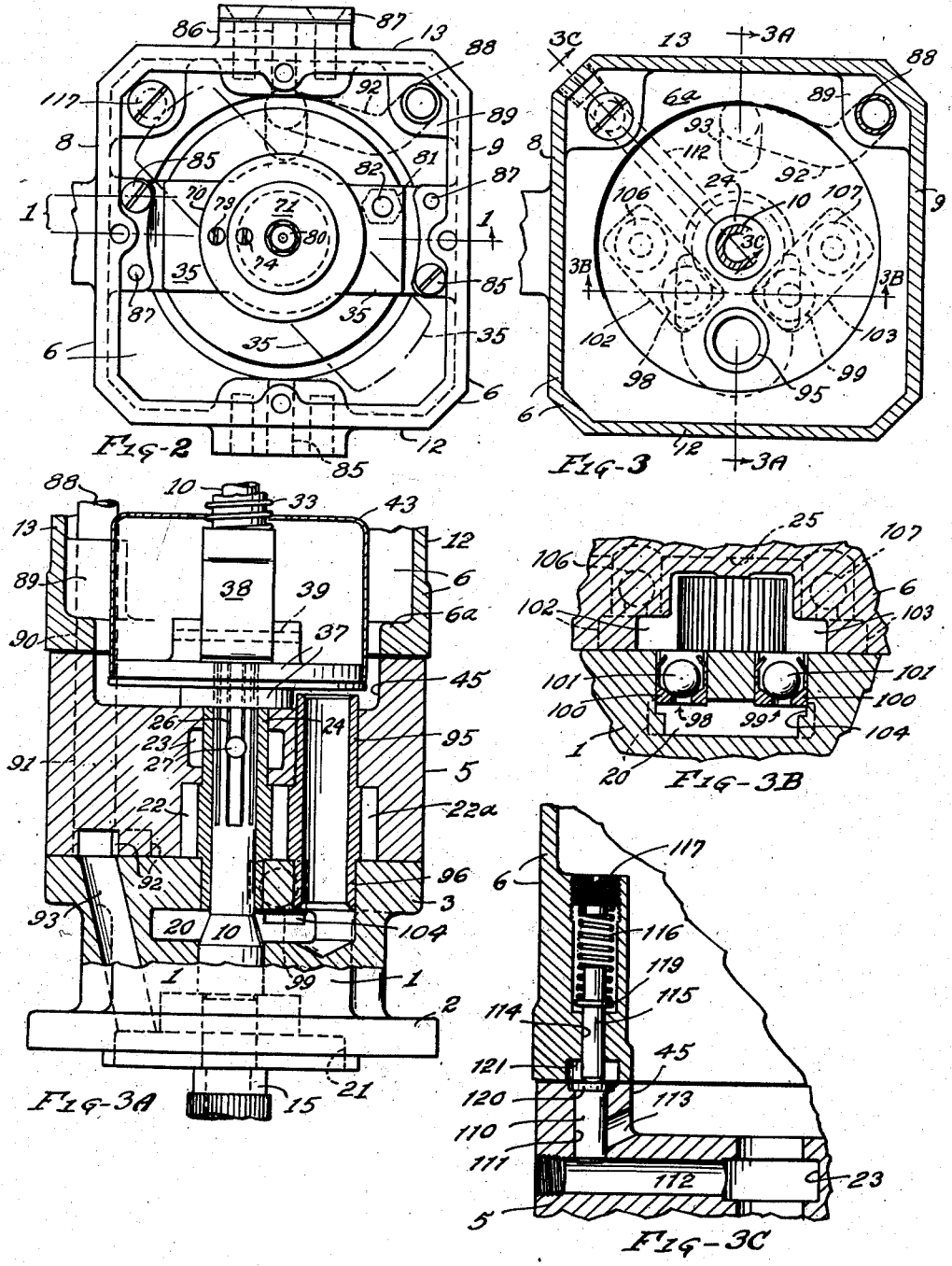
INVENTOR.
ALBERT KALIN
BY
ATTY.

2,270,306

UNITED STATES PATENT OFFICE 2,270,306

GOVERNOR

Albert Kalin, Cleveland, Ohio

Application December 30, 1940, Serial No. 372,271

17 Claims. (Cl. 264—3)

This invention relates to a speed governing mechanism for use with machines such as prime movers, and specifically to a mechanism for preventing overspeeding or racing of such machines. The general object is to provide an improved overspeed governor.

Diesel engine driven marine power plants illustrate specifically different uses for overspeed governors. When a marine engine has (inter alia) a geared connection with a propeller and, as during heavy seas, the propeller is lifted out of the water, racing of the engine may occur (e. g.) because the regular governor of the engine fails to act or does not respond quickly enough to reduce the engine speed materially before the propeller again strikes the water. In such event an overspeed governor can be used to shut down the engine and prevent damage from being done to the propeller or driving mechanism. In installations such as just outlined—especially where the engine operates in mechanical parallel with an electric motor to drive a common propeller as will be more fully explained presently—it is desirable that the overspeed governor be re-set, i. e. conditioned for subsequent operation, automatically after each actuation, so that the engine may resume normal speed or be re-started without requiring attention to the overspeed governor on part of the operator or operators. On the other hand, in Diesel driven generator units (as of such power plants as mentioned) racing of the engine indicates need of repair; and in that event the overspeed governor should not be re-set automatically but should remain in engine-stopping position until proper repairs are effected.

Marine installations requiring both hand re-set and automatic re-set overspeed governors may be arranged as follows: One engine and an electric motor operate, through intermediate mechanical gearing and fluid couplings, to drive a common propeller, and the motor is supplied with current by a generator driven by another engine (or at times by an electric storage plant supplied by such generator). Each engine would of course have its own speed regulating or regular governor. In the event the propeller leaves the water the first mentioned engine and the motor both tend to increase in speed, and if the regular governor of said first engine does not immediately shut off fuel to the engine the overspeed governor of said engine does so. Still the engine may attain sufficient overspeed to cause the overspeed governor to perform its operation (idly) because of being driven through the gearing by the electric motor. At all events it is desirable as soon as the propeller is again immersed that the engine resume operation and assist the motor in driving the ship. Therefore the overspeed governor of the first engine is arranged to be automatically re-set as soon as the engine after, overspeeding, slows down. But in the event the generator engine overspeeds and causes actuation of its overspeed governor that engine should remain shut down until the reason has been investigated; hence the generator engine has a hand re-set overspeed governor in addition to its regular governor.

A further object is to provide an overspeed governor which is convertible for hand re-set and automatic re-set operation, whereby any one of a supply of overspeed governors can be conditioned for whichever manner of operation is required.

The invention also contemplates the provision of an overspeed trip governor having a sleeve type of valve which is normally open to deliver hydraulic fluid idly therethrough in a path or circuit including a positive pressure source and a pressure responsive means which latter is associated with the engine to be governed, said means being capable of shutting down the engine; said valve having sleeve elements which are relatively rotated continually so long as the engine is operating (thus being free from static friction) and having normally inoperative overspeed-responsive mechanism associated therewith which, when overspeeding of the engine occurs, moves the sleeve elements axially relative to each other in a manner to block flow of fluid therethrough and to divert the output of the positive pressure source to the pressure responsive engine shut-down means.

Another object is to arrange for adjustment of spring force and travel-limiting abutment of the overspeed responsive valve mechanism referred to above.

Another object is to provide a hydraulic latch for holding the aforementioned valve sleeve elements in a relative position such that—in one setting of the latch—once the tripping operation occurs the engine cannot resume normal operation until a hand-resetting operation is effected; and—in another setting—the engine will resume normal operation as soon as its speed has been reduced to a desired point.

Another object is to maintain all the high pressure passages and ducts in or directly associated with a power or pump case portion of the overspeed governor unit, exclusive of the sump case portion thereof and to provide a pressure relief valve on said power or pump case portion to discharge excess fluid to the sump case after the overspeed tripping operation occurs.

Other specific objects will become apparent from the following description.

While the present invention has many uses some of which may and some of which necessarily will require modification of the structure as shown herein, it is believed that the illustrative embodiment will suffice to disclose the essential characteristics of the invention.

For convenience the mechanism shown will be referred to as an "overspeed trip"—signifying that, in event of overspeeding of a governed machine, the mechanism trips or stops overspeeding of that machine.

In the drawings Fig. 1 is a central vertical sectional view of the overspeed trip mechanism taken as indicated at 1—1 on Fig. 2. Figs. 1A and 1B are sectional views of valve parts as indicated on Fig. 1; Fig. 1C is a relatively enlarged view of the overspeed trip valve etc. of Fig. 1 in the relative position of parts assumed when overspeeding of the governed machine occurs. Fig. 1 shows the mechanism conditioned for requiring hand re-setting and Fig. 1C shows adjustment for enabling self-resetting or automatic return of the overspeed trip to normal relative position of the parts after the condition requiring the overspeed preventing functioning of the mechanism has ceased to exist. Fig. 2 is a plan view of the overspeed trip mechanism with a protective cover thereof removed. Fig. 3 is a sectional plan view substantially as indicated by the line 3—3 on Fig. 1, and Figs. 3A, 3B and 3C are fragmentary vertical sectional views as indicated on Fig. 3.

The mechanism shown is adapted to be mounted vertically on a Diesel engine and be driven by a rotary part of the engine the speed of which bears a constant relation to engine speed. To that end a base 1 is provided with a lower flange 2 adapted to be appropriately bolted to the engine adjacent such rotary part. An upper flange 3 of the base supports a pump case 5. The base and pump case are secured rigidly together at the base flange 3 through suitable screws (not shown). The pump case supports, on its upper side, a hollow sump case 6 having an inturned lower flange 6a adapted to be secured rigidly to the pump case as by screws (not shown). The sump case has a top closure or cover 7 removably attached thereto, as is evident from the drawings. As shown, the sump case and pump case are generally rectangular in horizontal cross section, with narrow oblique corner portions. For convenience the vertical walls 8 and 9 of the case which are shown in section in Fig. 1 will be referred to as left and right side walls respectively, and the walls 12 and 13 Figs. 2 and 3 as front and rear walls respectively.

Referring further to the base 1, a drive shaft 10 extends through this and the pump case and upwardly into the sump case. A driving sleeve 15, splined at 16 for connection to a rotated part of the engine, is secured to the drive shaft as by a pin 17. An anti-friction bearing 18 is provided for the drive shaft in the base; and above the bearing is an oil seal 19 of suitable form embracing a large diameter portion of the drive shaft. A pump supply receptacle for operating fluid is maintained in a circular recess 20 formed in the base around the drive shaft above the oil seal. A gear pump located in the pump case derives its fluid supply through the receptacle 20; and the oil seal blocks downward flow of fluid from the receptacle around the drive shaft. A lower recess 21 of the base, below the bearing 18, is open to the general oil sump, e. g. crank case, of the engine served by the present mechanism.

The gear pump is of a known type having a drive gear 22 and an idler gear 22a (see Fig. 3A). The gears are provided with pump chambers and duplex check valves, to be described below, and operate, during the entire time the engine is running, to maintain flow of operating fluid from the receptacle 20 to a circular recess 23 around an upper hub or shaft portion 24 of the drive gear through a horizontal main discharge outlet bore 25 in the pump case. Above and below the teeth of the gear 22 the hub or shaft portions of the gear have running-fit peripherally sealed contact with respective aligned bearing-affording bores of the pump case 5 and base 1, as will be apparent from Figs. 1 and 3A. The idler gear 22a is similarly constructed and will be more fully described later herein.

Fluid moved by the pump through the outlet 25 may be conveyed as through a duct, diagrammatically indicated at D Fig. 1, to a series of piston/cylinder elements H, the pistons P of which are normally restrained from movement by springs such as S. The strength of each spring is less than the pressure which can be applied to the several pistons by the pump. The pistons all become active to cause shutting down of the engine (as by causing disconnection of the injector pump driving mechanism of the engine and the injector pumps of individual engine cylinders) when the full force of the pump, as limited by a relief valve, to be described later, is applied at the piston/cylinder elements H.

The overspeed trip mechanism hereof normally provides for the continuous idle discharge of the output of the pump in a closed hydraulic circuit while maintaining the duct system D etc. charged with operating fluid; but, when overspeeding of the engine occurs, the entire pump output is then immediately diverted to the devices H until each plunger P has shut down or rendered inoperative the injector with which associated.

Referring further to Figs. 1 and 3A the drive gear 22 of the pump is splined to the drive shaft 10 as at 26 (Fig. 3A), and lateral holes 27 are drilled through the shaft and upper gear hub centrally of opposite spline grooves and tongues so as to communicate the pump discharge space 23 with an axial bore 28 of the drive shaft. The axial bore extends downwardly past the holes 27 and upwardly to the upper end of the shaft where it is closed by a plug element 29. Fluid forced into the pump discharge outlet 25 and space 23 is by-passed into the sump case through the bore 28 of the drive shaft during normal speed operation of the engine. The sump case is always kept substantially full of operating fluid as will be shown later herein.

The by-pass includes radial holes or ports 30 near the upper end of the bore 28 of the drive shaft and coacting holes or ports 31 in a main valve sleeve 32 (cf. Fig. 1A). The normal position of the valve sleeve is shown in Fig. 1 and the abnormal or raised position in Fig. 1C. A central circular bore of the valve sleeve 32 has a smooth running fit on an upper cylindrical portion of the drive shaft.

The main valve sleeve 32 is normally held in the lower position (Fig. 1) by a coil spring 33, and is always held against rotation by said spring. The spring surrounds the main valve sleeve; bears upwardly on an effective-spring-force adjusting sleeve 34 carried by a thrust plate 35 mounted in the sump case, and bears downwardly on an abutment formed by the upper race plate of an anti-friction bearing assembly 36, the latter being in fixed position on the lower end of the valve sleeve. In the lower position of the valve sleeve, fluid moves freely and continuously out of the by-pass holes or ports 30 and 31 because, as will be seen from Fig. 1A there are always at least two holes of each set in communication with each other in the lowered position of the valve sleeve. The combination of four holes 30 and five holes 31 maintains a constant effective by-pass opening area in all relatively turned positions of the drive shaft and valve sleeve in said lowered position of the valve sleeve.

To raise the valve sleeve and thus cut off the by-passage of pump output provided as just described a fly-ball mechanism is connected to the drive shaft so as to raise the valve sleeve 32 at an abnormally high speed of the engine. A ball head 37, in a circular recess 45 in the top side of the pump case, is connected to the drive shaft at upper portions of the spline 26 thereof and carries an appropriate set of ball arms 38 pivoted to upstanding ears of the ball head as on pins 39. The ball arm fingers 40 may normally rest against the top face of the ball head, as a convenient mean for limiting the downward movement of the valve sleeve 32, and, for operation bear upwardly on a lower race plate of the anti-friction bearing assembly 36. The bearing assembly is held together and in fixed relation to the valve sleeve by an enlarged head on a short sleeve 41 secured in the lower end of the valve sleeve as by a press fit or cross pin.

The lower race plate of the bearing 36 turns freely on the valve sleeve 32, the upper race plate being tight on the valve sleeve, so that the friction force of the spring 33 (always under considerable compression) can restrain the valve sleeve against turning and thus maintain the working surfaces of the valve sleeve and drive shaft in a free state ready for axial movement instantly whenever the necessity for axial movement arises. The friction force of the spring 33 on the spring adjusting sleeve 34 keeps the spring from turning. A cover 43 for the fly-ball mechanism may be snapped onto the circular rim of the ball head against a shoulder 44 thereof.

The ball arms are maintained by the downward force of the spring 33 in the position shown in Fig. 1 until the speed is reached at which—as determined by the setting of the adjusting sleeve 34 in the thrust plate 35—it is desired to stop the engine. Then the ball arms fly out to the position shown in Fig. 1C and remain there notwithstanding a fluctuation in speed over a considerable range because of the increased centrifugal force applied to the weights in all outwardly moved positions and because of the type of spring used to resist their outward movement (simple coil spring). This action (comparable to a snap action movement) ensures positive operation of the mechanism once racing or overspeeding of the engine starts.

As soon as the valve sleeve 32 moves to its upper position the by-passage of fluid output of the pump is checked by definite non-registration of all the valve ports 30 and 31 (Fig. 1C). Thereupon, as previously explained, the engine is shut down by building up of pressure in the main discharge outlet 25, conduit D, etc. At the same time (assuming the adjustment or setting of the mechanism shown in Fig. 1) the possibility of the engine starting up again as it returns toward normal speed is blocked by a hydraulic latch which holds the valve sleeve in raised position.

The hydraulic latch includes a check valve chamber 47 formed in part by the upper interior of the valve sleeve 32 and the upper plugged end of the drive shaft. Normally the chamber 47 is open and thus charged with operating fluid through an axial bore 48 and radial holes 49 in the plug, (holes 49 partly in the wall of the drive shaft) which radial holes normally operatively align with a set of holes 50 in the valve sleeve, arranged as shown in Fig. 1B. When, however, the valve sleeve is raised the chamber is closed at the bottom by non-registration of the holes 49 and 50 and opened at the top by movement of a check valve plug (ball 51) off a check valve seat provided in a centrally apertured valve seat element 52 suitably fixed in the main valve sleeve 32. The central opening in the valve seat element 52 communicates, through radial holes 53 in the valve sleeve 32, with the sump case which as stated above is always maintained full of operating fluid. The ball 51 may be held normally against its seat by a spring 54. Thus fluid is drawn into the check valve controlled chamber 47 as the main valve sleeve is raised, and the ball 51 holds it there, preventing return movement of the parts to normal position until the ball 51 has been moved off its seat. Since, whenever the valve sleeve 32 is in raised position, the fluid in the bore 28 of the drive shaft is under relatively great pressure, some fluid can be forced upwardly past the lower end of the plug 29 (as by making this portion of the plug slightly smaller than the upper end beyond the holes 49) so as to counteract leakage from the chamber 47 such as may be occasioned by the continued downward force of the spring 33 on the main valve sleeve.

For releasing the hydraulic latch and thus resetting the mechanism after actuation thereof, a pin 55 extends loosely through the check valve aperture for contact with the ball 51, and the upper end of the pin protrudes from the central bore of an upwardly extending stem portion 56 of the valve sleeve 32 in position for engagement by a hand re-setting knob 60 carried by the cover 7 and having a plunger portion 61 poised over the pin 55. The knob 60 is normally held in the raised position, in which shown, by a spring 62. An operator upon depressing the knob releases the ball 51 by the initial small downward movement of the knob, and then follows up the ball—holding it off its seat—by continued downward pressure on the knob as the spring 33 of the main valve sleeve returns the parts to initial position.

An adjustable stop collar or sleeve 65 for limiting the upward movement of the main valve sleeve is threaded into the effective-compression-adjusting sleeve 34 of the spring 33. The stop collar has an axial hole 66 through which the stem 56 of the main valve sleeve extends freely; and the lower end of the stop collar is arranged to abut a shoulder 67 on the main valve sleeve as shown in Fig. 1C.

The spring adjusting sleeve 34 has a wheel 70 thereon so that the adjustment can be effected easily by hand upon removal of the cover 7. The stop collar 65 can be adjusted similarly, the same having a wheel 71. When adjustment has been effected the wheel 70 is locked by setting a screw 73 of the wheel 70 against the thrust plate 35, and the stop collar then locked by setting a screw 74 carried by the wheel 71 against the wheel 70. The set screws can be secured by wiring the screws 73 and 74 together as shown in Fig. 1C—75 indicating a loop of wire which can be sealed in the usual manner to prevent unauthorized change in adjustment. The importance of relative adjustment of the spring force adjusting sleeve and the stop collar will be fully explained after description of the automatic re-set arrangement.

In order to make the matter of changing from hand re-setting to automatic re-setting sufficiently difficult so that the change is unlikely to be done unauthorizedly, the operation is accomplished by exchanging the position of two nuts 80 and 81 which fit the upper end of the main valve sleeve interchangeably, only one of which nuts can ordinarily be reached. Whichever nut is not in use is attached to a dummy stud 82 on the under side of the thrustplate, wherefore it is necessary to take out the thrust plate in order to get at the nut which is so mounted for safe keeping. Actually it is also necessary, in the absence of special tools, to remove the assembly comprising the thrust plate, main valve sleeve 32 spring 33, the spring adjusting sleeve 34 and valve sleeve stop collar 65 in order to release a lock nut 83 which secures the nut 80 (or 81) to the main valve sleeve stem 56.

As will be seen, from comparison of Figs. 1 and 2, the thrust plate, valve sleeve etc. assembly, mentioned above, can be removed from the sump case as a unit by removing two screws 85 (cf. Fig. 2) which hold the ends of the thrust plate 35 to respective ears 86, integral with the side walls 8 and 9, then depressing the plate to disconnect it from depending fixed dowels 87 (Fig. 2) and then rotating the plate into the position thereof indicated in broken lines in Fig. 2. Thereupon the assembly can be lifted out of the sump case and the nuts 80 and 81 interchanged in position. Afterward, when the assembly is returned to the case, the upward thrust of the main valve sleeve control spring 33 against the adjusting sleeve 34 holds the thrust plate in position on the dowels, thus facilitating the operation of turning the attaching screws into their threaded holes in the thrust plate. It does not take long to make the change; but does involve intimate knowledge of the mechanism and enough trouble effectively to prevent tampering with and improper setting of the mechanism. When once the mechanism is installed properly on an engine there is never any occasion to interchange the nuts 80 and 81.

As shown in Fig. 1C, when the nut 81 is placed in proper position on the stem 56 and locked by the nut 83 the ball 51 is held permanently off its valve seat so that the hydraulic latch is rendered inoperative to hold the main valve sleeve in position to keep the engine shut down after overspeeding; and that as soon as the engine returns nearly to normal speed the injector control plungers P are released.

Referring further to the adjustments provided by the spring-force-adjusting sleeve 34 and the stop collar 65, it is evident that in order for the upward movement of the main valve sleeve to be stopped with the fly-ball arms in the same or any predetermined desired position for each overspeed trip setting (i. e. notwithstanding variation of effective force of the spring 33 by the adjusting sleeve 34) the sleeve 34 and stop collar 65 must be adjustable independently of each other.

For example it may be desired to have the overspeed trip function to shut down the engine upon a small departure of speed from normal and to have the automatic re-setting take place almost immediately upon return of speed toward normal. In that event the spring adjusting sleeve 34 would be raised so that it would take less centrifugal force to cause outward movement of the ball arms 38, but the stop collar would be lowered in the adjusting sleeve so that the ball arms could not move to their maximum outward position, (see Fig. 1C) and thus be subjected to maximum outward force for a given speed of rotation of the drive shaft.

On the other hand it may be desired to have the overspeed trip operate to stop the engine only upon an unusual degree of overspeeding or upward departure from normal or set speed and to return to re-set position an appreciable time after the engine begins to slow down. To effect this one would screw the adjusting sleeve 34 down farther than usual in order to increase effective spring stress or force opposing outward movement of the ball arms and then screw the stop collar upwardly in the sleeve 34 so that the ball arms are not arrested intermediately of the two illustrated positions but allowed to assume their extreme outward positions when the valve sleeve is raised.

Referring to Fig. 1, and generally to all the views on sheet 2 of the drawings, operating fluid is introduced into the sump case, as from the lubrication system pump of the engine, through one of two openings 85 and 86 (Fig. 2 only) near the top of the sump case in the front and rear walls 12 and 13. Only one opening is used at one time (whichever is more convenient), the other being closed as by a plate 87 shown as closing the opening 86. More than enough fluid for operation of the mechanism is supplied in the manner indicated, and the excess is drained from the sump case by an overflow receiving tube 88 located at one corner of the sump case and which is supported in a boss 89 near the bottom of the sump case.

As shown particularly in Figs. 3 and 3A, the lower end of the overflow drain tube discharges the overflow from the sump case into a passage formed by aligned holes 90 and 91 (Fig. 3A only) in the boss 89 and pump case 5 respectively, a groove 92 in the under side of the pump case, one end of which groove is aligned with the hole 91, and, finally a hole 93 in the base 1, which hole extends from the other end of the groove 92 to the recess 21 on the lower side of the base. The recess 21, as previously mentioned, drains into the oil reservoir or sump of the engine.

The gear pump inlet chamber 20 is supplied with oil from the sump case as shown in Fig. 3A through hub or shaft portions 95 and 96 of the idler gear 22a which gear and portions thereof constitute a sleeve open at both ends. Bores in the pump case and base provide bearings for respective shaft portions of the idler gear. The upper shaft portion (95) extends upwardly from the floor of the cavity 45 around the ball head, so that it is fairly certain not to receive foreign matter which may settle to the bottom of the cavity, i. e. effective bottom of the sump.

Located at opposite sides of the meshing region of the pump gears as indicated in dotted lines in Fig. 3 (cf. Fig. 3B) are check valves 98 and 99 constituted by ball retaining sleeves 100 and balls 101. The sleeves are suitably held rigidly in appropriately positioned vertical bores 104 of the base, which bores intercept the pump supply reservoir cavity 20. The sleeves are thus open downwardly into the supply reservoir 20 and upwardly into communication with respective pressure chambers 102 and 103 (Figs. 1, 3, 3^A and 3^B) formed as obliquely extending short channels on the under side of the pump case 5. The pump pressure chambers are discommunicated adjacent the pump gears by the upper smooth face of the base and the gear embracing cavities of the pump case, as can best be seen by comparison of Figs. 3, 3^A and 3^B. As shown by Figs. 1 and 3 the pressure chambers 102 and 103 discharge into respective portions of the horizontal discharge bore 25 of the pump case, previously described, through ball retaining valve sleeves of check valves 106 and 107. The bore 25 extends to the right beyond the cavity 23 around the drive shaft 10 for communication with the valve 107. The valves 98 and 107 operate respectively to pass fluid to and from the gears during rotation of the gears in one direction and the valves 99 and 106 upon rotation of the gears in the opposite direction but in each case the fluid is pumped into the main discharge bore 25 and the hollow drive shaft 10.

When the overspeed trip operates to close the by-passage provided by the ports 30 and 31 of the drive shaft and valve sleeve, and all the pistons P have been moved to render the injectors of the engine inoperative, it is necessary to relieve the outlet of the pump. I arrange for this, as shown by Figs. 3 and 3^C, by providing a slidable relief valve plug 110 in a short vertical bore 111 of the pump case arranged to seal and unseal the outer end of a passage 112 leading radially outwardly from the cavity 23 which surrounds the drive shaft. The passage 112 communicates with the bore 111 at its outer end, and the bore 111 has intermediately of its ends a lateral outlet port 113 leading to the sump at the cavity 45 of the sump case. Directly above the bore 111 and slidable in a bore 114 of the sump case is a plunger 115 which is pressed downwardly by a spring 116 in an enlarged part of the bore 114. The spring is subject to adjustment by a screw 117 accessible through the top of the sump case. The plunger 115 and relief valve plug 110 have shoulders 119 and 120 respectively, limiting their downward movement, and the lower surface of the sump case has a counterbore at 121 to receive the shoulder portion 120 of the valve plug. When pressure in excess of that necessary fully to operate the pistons P is built up in the pump case at the discharge bore then the plug 110 is displaced upwardly until it unseals the lateral port 113 and permits discharge of fluid into the sump case.

With the arrangement just described the relief valve spring adjusting screw 117 is concealed in the sump case but readily accessible when the cover 7 is removed. The adjusting screw and the spring and plunger are parts of the sump case assembly, but the relief valve and fluid passages leading thereto are all in the pump case. No part of the sump case is, in fact, ever subjected to high pressure. All the high pressure passages and connections are in or associated with the pump case and base which can more readily be made rugged enough to withstand the high pressures and to withstand such violent shocks as the mechanism is apt to be subjected to at times.

I claim:

1. In an overspeed governor of the type described, two tubular elements in telescoping relation which together constitute a duct and also a normally open valve for venting the duct, said elements having complementary circular contacting surfaces, a pump drivingly connected with one of the elements and having means for discharging fluid to the duct, centrifugally acting means driven by one of said elements and having means constructed and arranged to slide said elements relative to each other in a manner to close the valve, means adapted to connect said one of said elements to a continuously rotating part of a machine to be governed, and means acting continuously to hold the other element against turning so that the complementary contacting surfaces are maintained continuously in a state of relative rotation.

2. In an overspeed governor of the type described, a rotary fluid pump adapted to be driven by a rotary part of a machine to be governed, delivery duct means for the pump including relatively slidably telescoping elements intercommunicating in a manner to provide a normally open by-pass valve for normally discharging the output of the pump idly, one of said relatively telescoping elements being drivingly connected with an element of the rotary pump, centrifugally operable means driven by and acting on said one of the telescoping elements to close the valve when the governed machine overspeeds, and means acting on the other of said relatively telescoping elements to hold the same against rotation.

3. In an overspeed governor of the type described, two tubular elements in telescoping relation which together constitute a duct concentric to both sleeves and a normally open valve for venting the duct, said elements having complementary circular contacting surfaces, fluid forcing means arranged to discharge hydraulic fluid to the duct, centrifugally acting means driven by one of said elements and having means constructed and arranged to slide said elements relative to each other in a manner to close the valve, means adapted to connect said one element to a continuously rotating part of a machine to be governed, and means acting continuously to hold the other element against turning so that the complementary contacting surfaces are maintained continuously in a state of relative rotation.

4. In a governor, a hollow fluid conducting shaft adapted to be driven by a machine to be governed, means arranged to supply hydraulic fluid to the interior of the shaft, said means including a duct adapted also to supply fluid unidirectionally to a fluid-pressure-operated control element of such machine, centrifugally acting mechanism connected with the shaft and turned thereby, a sleeve in telescoping slidable relation to the shaft and operatively connected with the centrifugally acting mechanism so that the sleeve is moved axially thereby at a predeterminable speed of the shaft, said sleeve and hollow shaft being constructed and arranged to constitute a valve which is normally open to discharge the hydraulic fluid out of the shaft and which is closed when the sleeve is moved axially as stated.

5. In a governor, a pump case and a rotary pump therein, a pump-driving shaft connected with a rotary element of the pump and extending from the case, said pump case having a delivery passage therein adapted for connection with a pressure actuated device, a portion of said passage surrounding the shaft, said shaft having a hollow portion with a lateral passage leading therefrom for admitting fluid from said portion of the delivery passage to the interior of the shaft, a casing surrounding the hollow portion of the shaft, a valve sleeve in the casing slidable on said hollow portion, means to hold the sleeve against rotation, said sleeve and hollow portion of the shaft having an unequal number of radial ports in the same transverse plane and cooperating normally to enable discharge of fluid from the interior of the shaft into the casing at a substantially uniform rate notwithstanding relative rotation of the sleeve and hollow shaft portion, centrifugally acting mechanism arranged to move the valve sleeve axially in a manner to move the ports into separate planes and close the ports, and resilient means normally holding the valve sleeve in position to maintain the ports open.

6. In an overspeed governor, a fluid pump adapted to be driven by a rotary part of a machine to be governed, duct means including a by-pass valve arranged for normally discharging the output of the pump idly, resilient means acting in one direction on an element of the valve normally to hold the valve in open position, centrifugally operable means acting on the same element in opposition to the resilient means to move said element in a manner to close the valve when the governed machine overspeeds, an adjusting member connected with the resilient means for varying the effective strength thereof, and adjusting means carried on the adjusting member and operable independently of said adjusting member for limiting the valve closing movement of said valve element.

7. In an overspeed governor, a rotary member adapted for connection with a machine to be governed, a hydraulic pump, means constituting a discharge duct for the pump, said means including a normally open by-pass valve by which the output of the pump is discharged idly, a centrifugally actuatable mechanism connected with the rotary member and movable thereby to close the by-pass valve, resiliently stressed means continuously opposing actuation of the mechanism to close the valve, and two concentric adjusting members threaded together and one threaded to a fixed supporting member, one threaded member being arranged variably to limit the closing movement of the valve, the other bearing on the resiliently stressed means in a manner to adjust its effective force.

8. In a governor, a casing, a hollow shaft projecting into the casing and adapted to be driven by a machine to be governed, means arranged to supply hydraulic fluid to the interior of the shaft, said means including a duct adapted also to supply fluid to a fluid-pressure-operated control element of such machine, centrifugally acting means connected with the shaft and turned thereby, a sleeve in telescoping slidable relation to the shaft and operatively connected with the centrifugally acting means so that the sleeve is moved axially thereby at a predeterminable speed of the shaft, said sleeve and hollow shaft being constructed and arranged to constitute a valve which is normally open to discharge the hydraulic fluid out of the shaft and which is closed when the sleeve is moved axially as stated, a coil spring surrounding the sleeve, one end of the spring bearing on the sleeve in a manner opposing said movement thereof by the centrifugally acting means, a rigid support in the casing, and two adjusting members coaxial with the sleeve and threaded together, one being threaded into the support, one of the members abutting the other end of the spring to adjust its effective force and the other member being arranged to abut the sleeve and stop movement thereof in a position of the sleeve in which the valve is closed.

9. Governor mechanism according to claim 8 wherein the rigid support is a readily detachable part of the casing and constitutes with said sleeve coil spring and the two adjusting members a self-contained assembly which is removable from the casing as a unit.

10. In an overspeed governor, a hydraulic fluid pump, conduit means connected with the pump and arranged normally to discharge the fluid output of the pump in a closed hydraulic circuit which includes the pump, said conduit means having a valve thereon, centrifugally operable means arranged to operate the valve to block said circuit when overspeeding occurs and normally to maintain the circuit unblocked, and a releasable check valve mechanism constituting a hydraulic latch for holding the valve in circuit blocking position.

11. In an overspeed governor, a fluid pump adapted to be driven by a rotary part of a machine to be governed, delivery duct means including a by-pass valve arranged for normally discharging the output of the pump idly, yielding means connected with the valve and acting thereon normally to hold the valve in open position, centrifugally acting means adapted and arranged to close the valve when the governed machine overspeeds, and a releasable check valve mechanism constituting a hydraulic latch connected to the valve and arranged to operate automatically consequent upon closing of the valve to hold it in closed position.

12. In an overspeed governor, a fluid pump adapted to be driven by a rotary part of a machine to be governed, delivery duct means including relatively slidably telescoping elements constituting a by-pass valve arranged for normally discharging the output of the pump idly, yielding means connected with one element of the valve and acting thereon normally to hold the valve in open position, centrifugally acting means acting on the same valve element to close the valve when the governed machine overspeeds, a fluid sump surrounding the by-pass valve, means forming a check valve chamber between said valve elements and submerged by fluid in the sump, the space constituting said check valve chamber being expanded when the by-pass valve is closed and the plug of the check valve closing by movement outwardly of the chamber so as to constitute a hydraulic latch for the relatively slidable elements, and means constructed and arranged to engage the plug and release the check valve.

13. In an overspeed governor, a hydraulic pump adapted to be driven by a machine to be governed to maintain a supply of fluid to a pressure operated device of such machine, a centrifugally operable by-pass valve mechanism including a by-pass duct connected with the delivery side of the pump and a valve controlling the duct normally to enable discharge of fluid therethrough but arranged to be operated centrifugally in event of overspeeding to block such discharge and divert the pump output to such pressure operated device, resilient means connected with the valve and normally operating to open the valve when the latter is not closed by the centrifugal action of said mechanism, means constituting a hydraulically operable latch for the by-pass valve, said means being arranged to hold the by-pass valve in closed position when once closed, and means adapted to be demountably secured to a portion of the latch constituting means, and, when so secured, operating to prevent operation of the latch whereby the resilient means will always operate upon reduction in speed to restore the valve to open position.

14. In an overspeed governor, a rigid base constituting a pump housing having a fluid supply chamber in its lower portion and a pump chamber above the supply chamber, a sump case surmounting the base and adapted to retain hydraulic fluid, a driving gear and an idler gear side by side in the pump chamber and valving means cooperatively arranged with the gears and pump chamber to enable the gears to pump fluid from the supply chamber upwardly, a hollow shaft connected with one of the pump gears, means to conduct the fluid output of the pump from the pump chamber into the hollow shaft, a centrifugally operable device including a sleeve valve element which is moved on the shaft incident to subjection of the governor to overspeeding and which sleeve cooperates with the hollow shaft normally to enable flow of the pump output from the hollow shaft into the sump case but which, when moved as aforesaid, blocks such flow so as to divert the fluid output of the pump in a manner to enable a governing operation to be effected by said output, the other gear being tubular and having its upper effective end extending in fluid receiving relation to the sump case and its lower effective end communicating with said fluid supply chamber.

15. In an overspeed governor, a rotary hydraulic pump, a case for the pump having a discharge passage formed therein adapted for connection with a pressure operated device of a machine to be governed, a sump case surmounting the pump case and supplying the pump, a conduit connected with the discharge passage and arranged to convey the normal output of the pump into the sump case, centrifugally operable means in the sump case including a normally open valve for discharging said output, said means acting to close the valve when overspeed is imparted to the centrifugally operable means, said pump case having a relief valve port wholly in the pump case and leading from the discharge passage thereof into the sump case, a relief valve plug closing said port, and spring means supported wholly on the sump case and arranged to act on the plug normally to hold the latter in port-closing position.

16. In a governor having a pump adapted continuously to deliver hydraulic fluid to a normally open by-pass valve comprising telescoping valve members and having a centrifugally operable mechanism arranged to relatively shift the members to close the valve upon subjection of the governor to overspeed on part of a governed machine; one of the valve members being a sleeve having an axially extending check valve aperture, a spring closed check valve plug closing said aperture, the other member cooperating with the sleeve to form an expansible and contractible check valve chamber, a pin extending from the check valve aperture through one end of the sleeve, a sump case surrounding the by-pass valve and arranged to maintain the check valve aperture submerged with fluid, a cover for the sump case, and a latch release device movably supported on the cover and having an outer portion adapted to be moved manually and an inner portion normally spaced from the outer end of the pin but engageable therewith upon movement of the device to release the check valve plug from its seat.

17. The arrangement according to claim 16 wherein the sleeve portion of the by-pass valve is threaded at the end thereof nearest the sump case cover and the releasing pin is arranged to be held permanently in check-valve-release position by a cap nut engaging the threads.

ALBERT KALIN.